Patented Sept. 2, 1924.

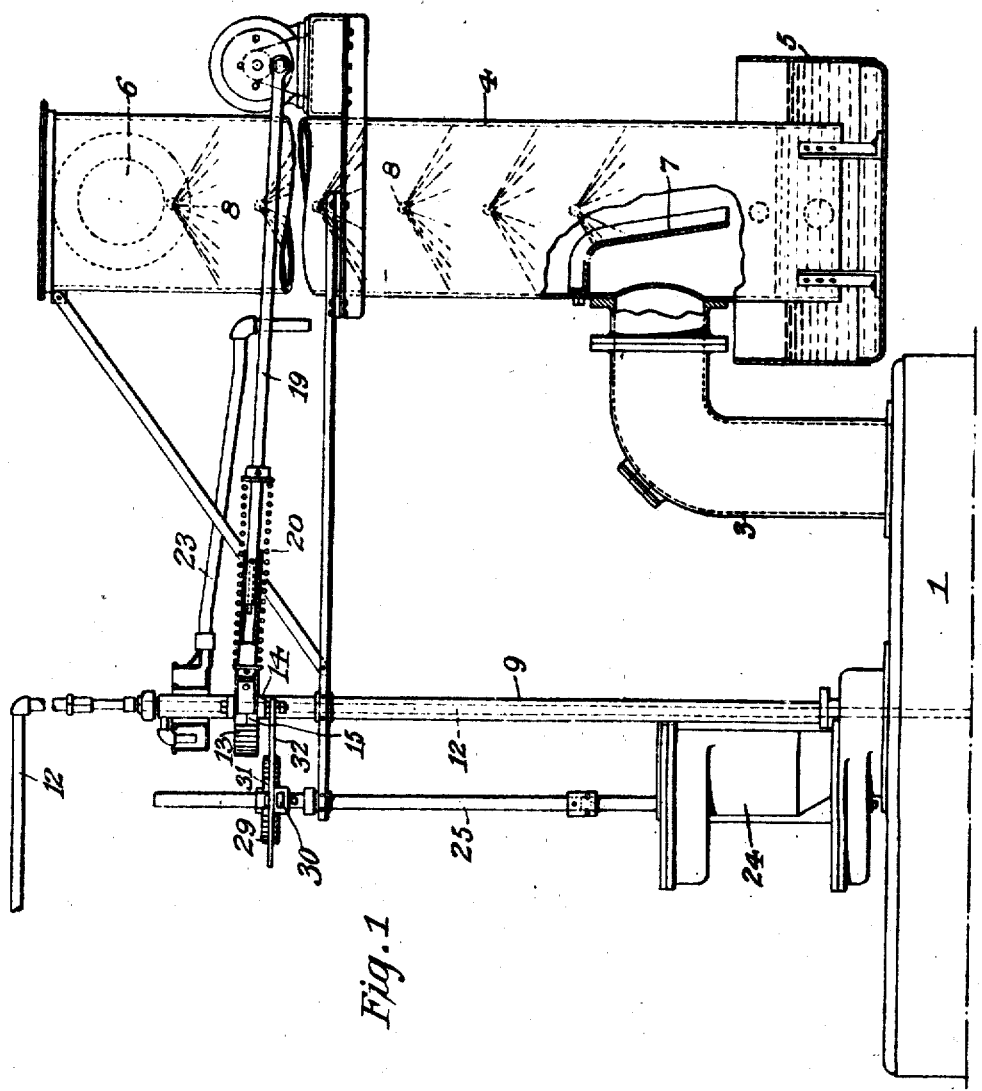

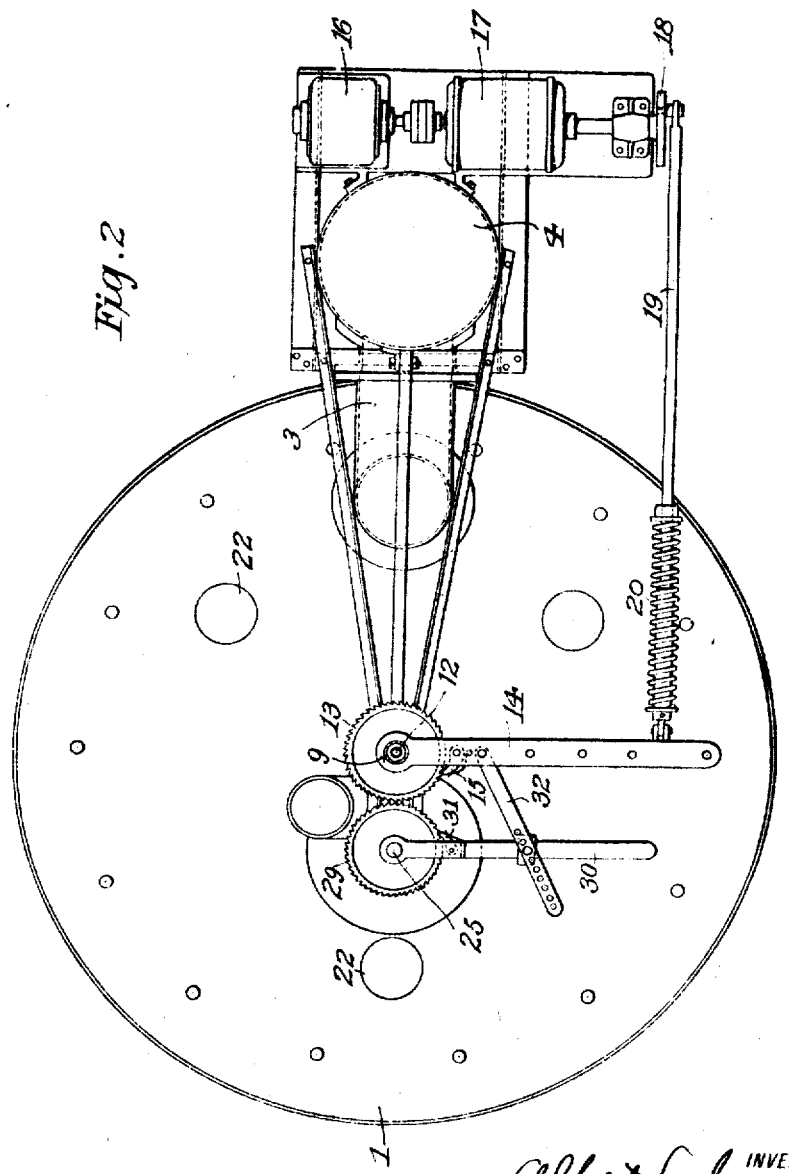

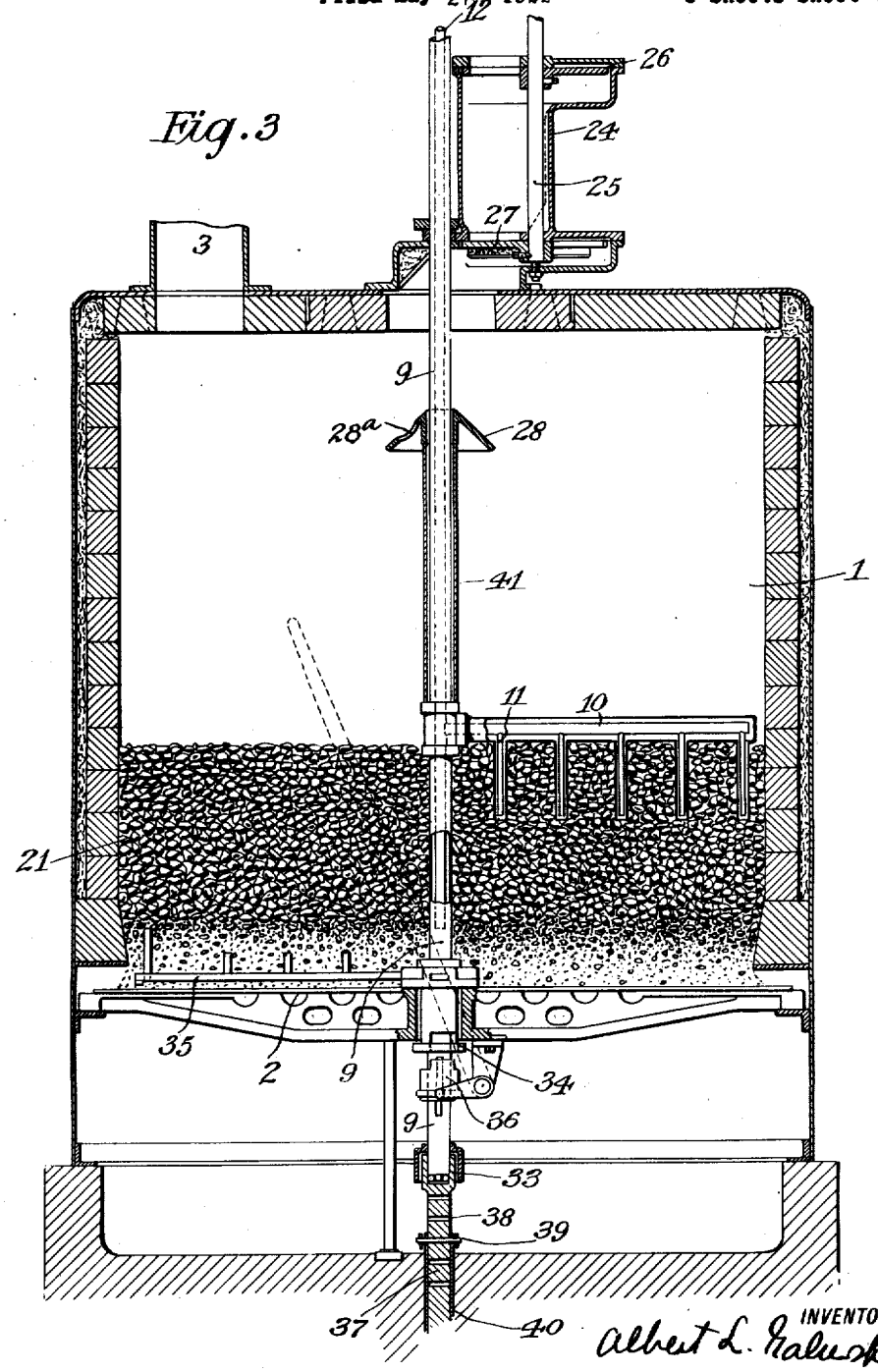

1,506,826

UNITED STATES PATENT OFFICE.

ALBERT L. GALUSHA, OF CALDWELL, NEW JERSEY.

GAS PRODUCER.

Application filed May 27, 1922. Serial No. 564,092.

*To all whom it may concern:*

Be it known that I, ALBERT L. GALUSHA, a citizen of the United States of America, residing at Caldwell, in the county of Essex, and State of New Jersey, have invented certain new and useful Improvements in Gas Producers, of which the following is a full, clear, and exact description.

In the art of making producer gas on a large scale, the apparatus used, if capable of economical and good practical results, must embody certain essential features of construction and operation accessory to the main scheme of operation. Primarily, for considerations of economy of operation, provision must be made to eliminate hand labor, by constructions that will render the device purely automatic in its action.

Again, in order to obtain the highest and most uniform quality of gas, particularly from fuel having a large volatile content, careful consideration should be given to provision for securing the following important conditions. First: a continuous feed of the fuel at the same rate as that at which it is being gasified. Second: an uninterrupted stirring, breaking up and compacting of the fuel-bed so as to insure the presence of very small draft holes uniformly distributed throughout the bed and to prevent caking, chimney holes and an uneven fire. Third: the levelling off of both top and bottom of fire so that it as well as the ash-bed, may remain of uniform depth. Fourth: the removal of the ash continuously at the rate at which it is produced, so as to keep the ash of uniform depth. Fifth: the breaking up and stirring of the ash and clinkers, so that the draft through every square inch of the bed shall always be the same. Sixth: the supply of the draft at a uniform rate over the entire under surface of the fire, and lastly, the elimination of the need for periodic shut-downs for the purpose of clearing the fire.

Recognizing these theoretical requirements in apparatus of this nature, I have devised an improved gas producer capable of accomplishing all of the above stated functions and operations, and upon this invention my present application for Letters Patent is based. This apparatus is illustrated in the accompanying drawings in which:

Fig. 1 is a view in elevation looking from the right, though certain parts are shown in section, of the upper part of my improved gas producer with the novel accessory parts which I have devised.

Fig. 2 is a top plan view of the same; and,

Fig. 3 a vertical central section of the fire chamber or gas producing element looking from the left.

In general design the apparatus comprises a closed chamber 1, lined with refractory material, provided with a grate 2, means for feeding fuel on to the bed and the other devices hereinafter described. From the top of this chamber leads an outlet pipe 3 to a vertical cylindrical chamber 4 which is formed without a closure at the bottom and set in a tank 5 of water or other fluid, and having an outlet 6 at the top. Over the orifice of the tube 3 is an inclined plate 7 which serves to deflect the gas entering the chamber, to assist in throwing down any solid particles that it may contain into the water in tank 5, but mainly to prevent the sprayed fluid from passing down the pipe 3 into the fire. The gas with its impurities, mainly tar in a more or less volatilized condition, passes up through the chamber and through a series of liquid sprays 8 which cool the gas and condense the tarry constituents so that they may be more readily and perfectly removed by the scrubber and tar extractor (not shown) to which the outlet 6 carries gas.

In the chamber 1 is a vertical hollow spindle 9 resting on an anti-friction bearing 33 beneath the chamber. This spindle carries a rake or stirrer 10 shown as consisting of a single arm with downwardly extending teeth 11, but this construction may be varied at will. In other words, the number of arms comprising the rake is not of the essence of my invention.

Down through the hollow spindle 9 extends a water tube 12 from which a branch extends out through the hollow rake arm 10, and having small branches passing down through the hollow teeth 11. In the use of the apparatus water is forced down the tube 12 and flows out of the open ends of the same and its branches and back up through the spindle to an overflow trough and pipe 23, by which it is carried off. In this way the spindle and the rake are kept cool and prevented from injury by over-heating.

The vertical spindle 9 above the fuel-bed as well as the rake arm 10 are in positions where they are exposed to high temperatures and for that reason it would take considerable water to keep them cool if they were not shielded in part from the heat. To protect them I encase them in close-fitting tubes 41 which protect the metal under them from injury or destruction. This precaution I have found to be of very great practical advantage in the use of this apparatus.

To the spindle 9 above the chamber is secured a ratchet wheel 13 and swinging about the spindle as a pivotal center is an arm 14 carrying a pawl 15 of the usual construction. To oscillate the arm 14 and thereby impart rotation to the spindle I employ an electric motor 16 coupled with a speed-reducer 17 which, by means of an eccentric disk 18, imparts reciprocatory movement to a rod 19 connected to the arm 14.

The rod 19 is not rigid but comprises a spiral spring arranged to permit the rod to yield and shorten in case it meets in its reciprocation a resistance exceeding a predetermined amount. Normally the oscillating movement of the arm 14 imparts a slow step-by-step or intermittent rotary movement to the spindle 9 and carries around the rake 10, and by this means the top of the fuel-bed 21 is kept loose and stirred and leveled off. Should the rake 10 encounter a mass of clinker, or a resistance above normal, the rod 19 will yield and shorten and the pawl either shorten its stroke or cease altogether to rotate the ratchet wheel 13.

The construction of this device is shown in detail in Fig. 1, as comprising a telescoping rod 19, the two parts of which are connected together by a spiral spring 20, this being a typical way of securing its operative characteristics. It thus has a fixed length unless the resistance of the driven lever arm 10 becomes too great, in which event the spring 20 permits the rod to shorten so that the vertical shaft 9 is not driven at all or is driven at a slower rate, by reason of the reduced amplitude of the movement of the arm 14. It is manifest that the forward or operative end of the rod 19 may remain stationary, or reciprocate with a shorter play than the other end, notwithstanding the driving end of the rod continues to make its full stroke.

It follows from this that when the lowering of the fuel-bed in the producer by combustion or gasification reduces the resistance, or this resistance has been otherwise removed, the rapidity of rotation of the shaft increases, or after actual stoppage, recommences. This produces an automatic change in the rate of fuel feed. It also acts as a safety device in case of a clinker or other obstruction, and prevents breakage and damage.

The cessation of the click of the pawl gives notice at once of an obstruction, which an attendant may at once remove by pokers introduced through suitable opening, as 22, in the top of the chamber.

On top of the chamber 1, with an opening through which the spindle 9 passes concentrically, is a fuel feed device. This comprises a receptacle 24 with enlargements at top and bottom, through which passes a shaft 25 carrying two disks 26 and 27 which occupy the said enlargements. In each disk is an opening, but that in one is 180° from that in the other so that, if the shaft 25 be rotated, the feed receptacle is first opened to a hopper above, but closed from communication with the interior of chamber 1, and then closed from the hopper and opened to the fuel bed. In this way the receptacle 24 is alternately filled with and emptied of fuel, and the latter delivered to the bed in uniform quantity regulated by the speed of rotation of the shaft 25.

Beneath the orifice through which the fuel is delivered is a conical deflecting plate 28 which spreads the falling fuel over the fire bed, but which contains perforations 28ᵃ to permit the proper amount to fall on or about the center of said bed.

The shaft or spindle 25 has secured to it a ratchet wheel 29 and swinging about said shaft as a center is an arm 30 carrying a pawl 31 which engages with the said ratchet wheel. A link 32 connects the arm 14 with the arm 30 and in order to regulate the speed of rotation of shaft 25 and hence the rate of fuel feed, this link may be connected to different points on the arm 14 and at different points along its own length to the arm 30. It imparts the movements of the arm 14 to the arm 30, and hence rotates the shaft 25; moving the point of attachment of arm 32 nearer to the shaft 25, increases the fuel feed, and conversely, moving the point of attachment of the other end of link or arm 32 with the arm 14 nearer to the shaft 12, also decreases the rate of fuel feed.

It is desirable that the ash be gradually shaken down through the grate 2, and this should be and is most profitably done continuously at the same rate as the ash is made, so as to keep the ash above the grate at a uniform depth. For this purpose I secure to a sleeve 34 surrounding the spindle 9 and just above the grate, one or more arms 35 with vertical teeth. Beneath the grate is a clutch 36 keyed to but sliding on the spindle 9. Normally the ash-removing arm is slowly revolving all of the time. Should it grind down the ash too fast the clutch 36 is thrown out, whereupon the arm ceases to revolve and no ash is removed until the clutch is thrown in again.

The jaw clutch 36 should be constructed in any well known manner to assure the same relation between the ash rake and the agitator arm at all times when the ash rake is in operation.

The level of the fuel bed or mass of the incandescent fuel in devices of this nature is an important consideration, as upon this depends, in a measure, the volume of the gas developed and delivered. To control this the bearing 33 is in a vertically adjustable column or post 37. This column has a number of passages 38 through it, and it may be raised or lowered as desired, and held in its adjusted position by means of a bolt 39 passed through holes in a stationary tube 40 and through one of the passages 38.

In the above specification I have limited the description as far as practicable to the novel features of my invention and have not gone into such details as are common and well known in the art. These include the proper means of support for the various elements; the specific construction of parts, and the method of operation of the apparatus as a whole.

It will be seen that a distinguishing feature of this device is the use of a single vertical shaft as the driving means instead of the separate complicated and expensive sets of mechanism which have heretofore been used.

What I claim is:—

1. In a gas producer of the kind herein described, the combination with a vertical spindle extending through the fuel bed, of a rake or stirrer secured thereto, a ratchet wheel on said spindle, a pawl engaging therewith, a rotary motor device and yielding connections between the same and the pawl for operating the same and thereby imparting continuously a step-by-step rotation to said spindle.

2. In a gas producer of the kind herein described, the combination with a spindle extending through the fuel bed, a rake carried thereby, a ratchet wheel secured to the spindle, a pawl engaging said ratchet wheel, a longitudinally compressible rod actuating the pawl and a motor for reciprocating said rod.

3. In a gas producer of the kind herein described, the combination with a spindle extending through the fuel bed, a rake carried thereby, a ratchet wheel secured to the spindle, a pawl engaging therewith, a pivoted arm carrying said pawl, a longitudinally compressible rod connected with said arm and means for reciprocating said rod.

4. In a gas producer of the kind herein described, the combination with a spindle extending through the fuel bed, a rake carried thereby, a ratchet wheel secured to said spindle, a pawl engaging therewith, a pivoted swinging arm carrying said pawl, a rod comprising a compressible spring connected to said arm, and means for reciprocating said rod.

5. In a gas producer of the kind herein described, the combination of a spindle extending through the fuel bed, a rake carried thereby, an oscillating arm, pawl and ratchet mechanism operated thereby for imparting step-by-step rotation to the spindle, a rotary fuel feeding means and pawl and ratchet mechanism operated from and by means of the oscillating arm for imparting rotation to said fuel feeding means.

6. In a gas producer of the kind herein described, the combination with a spindle extending through the fuel bed, a rake rigidly secured to and carried thereby and means for rotating the spindle, of an ash stirring arm at the bottom of the fuel bed carried by but not permanently connected to the spindle, and means for connecting it to said spindle when it is desired to rotate it.

7. In a gas producer of the kind herein described, the combination with a spindle extending through the fuel bed, a rake carried thereby and means for rotating the same, of a sleeve on said spindle, an ash stirring arm carried thereby, and a clutch for connecting the spindle and said sleeve.

8. In a gas producer of the kind described, the combination with a spindle extending through the fuel bed, a rake carried thereby and means for rotating said spindle, of a vertically adjustable column or post and constituting a bearing for the lower end of the spindle carried thereby.

9. In a gas producer of the kind described, the combination with a hollow spindle extending through the fuel bed, of a hollow rake arm carried thereby, a water tube extending through the spindle and rake arm whereby a flow of water may be maintained through the same and a heat protective casing surrounding the spindle above the fuel bed and also above the rake arm.

10. In a gas producer of the kind herein described, the combination with a rotating fuel agitator and a rotary fuel feeding device, and means for imparting to both corresponding speeds of rotation, said means comprising a ratchet and pawl, of a power operated reciprocating means for operating the pawl the throw of which varies in length according to the resistance encountered by the fuel agitator whereby the rate of fuel feed is automatically controlled.

11. The combination with the fire chamber of a gas producer, of a fuel feed hopper arranged centrally above the same, a vertical spindle passing through the fuel orifice and the fuel bed, a conical fuel deflector carried by said spindle provided with holes through which the proper proportion of fuel falls upon the center of the bed.

12. The combination with the fire chamber of a gas producer, of a vertical spindle extending down through the chamber and means for imparting rotation thereto, of a fuel agitator and an ash rake both carried by and operated by the said spindle, and means for disconnecting the ash rake from its operative connection with the spindle, without affecting the agitator.

13. The combination with the fire chamber of a gas producer, of a vertical spindle extending down through the same and means for imparting rotation thereto, of a fuel agitating arm or rake and an arm constituting an ash rake both carried and operated by the spindle, and a jaw clutch for connecting and disconnecting the ash rake and spindle.

In testimony whereof I hereto affix my signature.

ALBERT L. GALUSHA.